United States Patent
Lin

(10) Patent No.: US 11,144,299 B2
(45) Date of Patent: Oct. 12, 2021

(54) FIRMWARE UPDATING METHOD

(71) Applicant: Silicon Motion, Inc., Jhubei (TW)

(72) Inventor: Chien-Ting Lin, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 152 days.

(21) Appl. No.: 16/360,034

(22) Filed: Mar. 21, 2019

(65) Prior Publication Data

US 2020/0012487 A1 Jan. 9, 2020

(30) Foreign Application Priority Data

Jul. 5, 2018 (TW) .................. 107123307

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ... G06F 8/65; G06F 8/654; G06F 8/71; G06F 11/00; G06F 11/1402; G06F 11/1448
See application file for complete search history.

(56) References Cited

U.S. PATENT DOCUMENTS

| | | | | |
|---|---|---|---|---|
| 8,868,796 B1* | 10/2014 | Wojcik | ...................... | G06F 8/65 710/8 |
| 2003/0182414 A1* | 9/2003 | O'Neill | ................. | G06F 9/3004 709/223 |
| 2009/0064125 A1* | 3/2009 | Venkatachalam | ....... | G06F 21/85 717/170 |
| 2009/0083475 A1* | 3/2009 | Hsiao | ........................ | G06F 8/65 711/103 |
| 2011/0179406 A1* | 7/2011 | Ohama | ............... | G06F 11/1433 717/168 |
| 2012/0072897 A1* | 3/2012 | Selvam | ..................... | G06F 8/66 717/171 |
| 2012/0260244 A1* | 10/2012 | Keller | ..................... | G06F 8/654 717/173 |
| 2014/0201727 A1* | 7/2014 | Asselin | ..................... | G06F 8/65 717/170 |
| 2014/0223424 A1* | 8/2014 | Han | ........................ | G06F 8/654 717/173 |
| 2017/0097819 A1* | 4/2017 | Ozturk | ...................... | G06F 8/65 |
| 2019/0220271 A1* | 7/2019 | Olderdissen | ............ | G06F 8/654 |

* cited by examiner

*Primary Examiner* — Duy Khuong T Nguyen

(57) ABSTRACT

A firmware updating method is provided. The firmware updating method is adapted to a data storage device, and it can generate a new parameter table according to a conversion formula segment in an update image file required for updating the data storage device. Therefore, even if in a condition where there is a parameter change between a code segment of an old version firmware and a code segment of a new version firmware, the updated or upgraded data storage device can still operate normally.

9 Claims, 6 Drawing Sheets

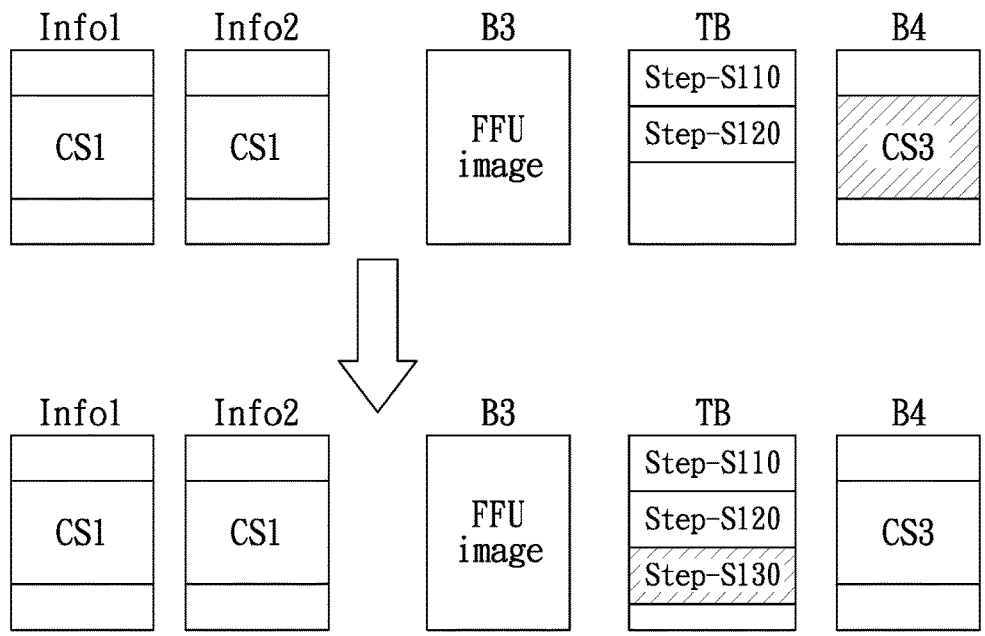
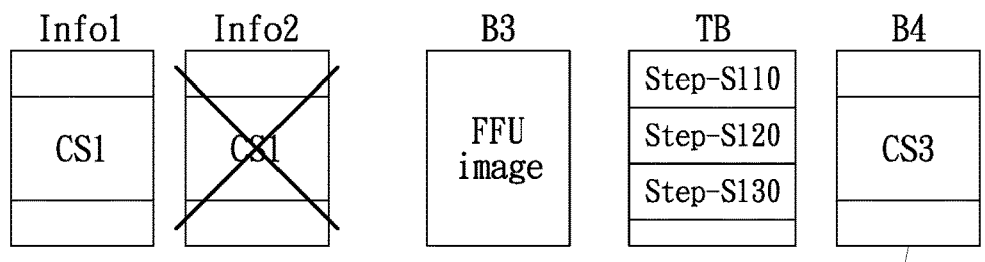
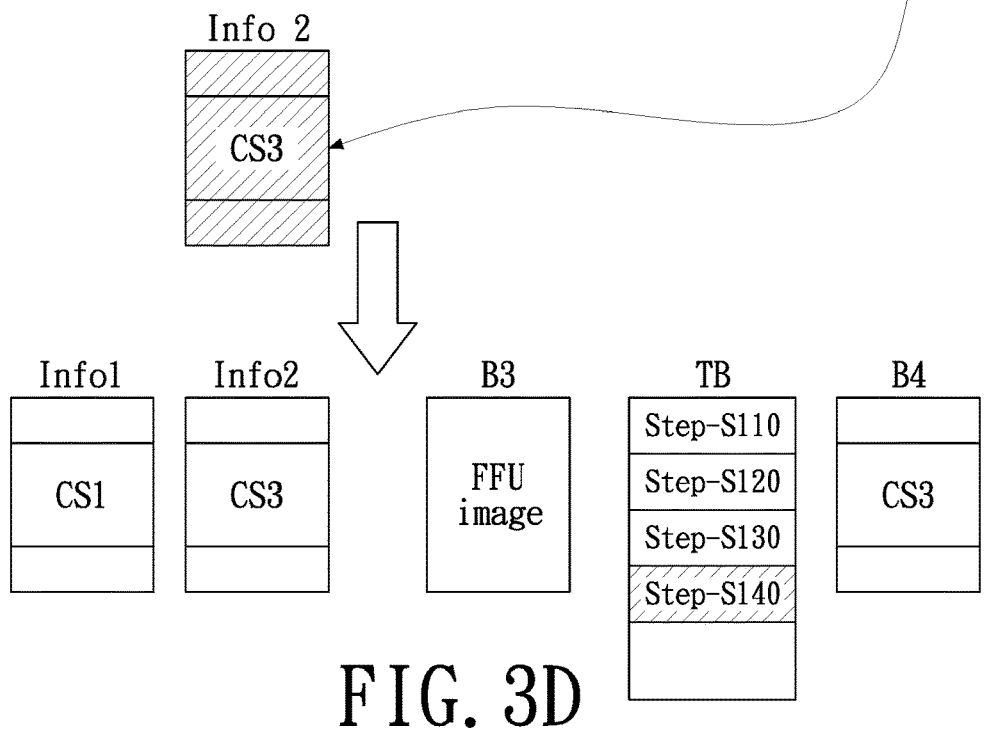
FIG. 3C
FIG. 3D

FIRMWARE UPDATING METHOD

FIELD OF THE INVENTION

The present invention relates to a firmware updating method, and more particularly to a firmware updating method capable of generating a new parameter table according to a conversion formula segment in an update image file required for updating.

BACKGROUND OF THE INVENTION

Generally, the data storage device is composed of a controller and a non-volatile memory such as a flash memory, and a code segment of a firmware required for the operation of the data storage device is usually burned in the non-volatile memory and released with the data storage device. After the data storage device has been released, in order to fix defects in the code segment or to provide new services or functions, the manufacturer or developer may provide a code segment of a new version firmware for updating or upgrading the data storage device. However, in the prior art, the condition where there is a parameter change between the code segment of the old version firmware and the code segment of the new version firmware is not allowed, otherwise the updated or upgraded data storage device will not be able to operate.

SUMMARY OF THE INVENTION

In view of the above, an object of the present invention is to provide a firmware updating method capable of generating a new parameter table according to a conversion formula segment in an update image file required for updating. To achieve the above object, an embodiment of the present invention provides a firmware updating method adapted to a data storage device. The data storage device comprises a non-volatile memory and a controller. The non-volatile memory comprises a plurality of blocks, and both a first block and a second block in the blocks store a code segment of an old version firmware, and the firmware updating method comprises the following steps. Firstly, receiving an update image file required for updating the data storage device by the controller, and writing the update image file to a third block in the blocks, wherein the update image file comprises the code segment of a new version firmware and a conversion formula segment related to the code segment of the old version firmware. Secondly, obtaining the conversion formula segment from the update image file by the controller, and generating a second parameter table according to the conversion formula segment and a first parameter table, wherein the first parameter table stores the parameters required for the operation of the code segment of the old version firmware, and the second parameter table stores the parameters required for the operation of the code segment of the new version firmware. Next, obtaining the code segment of the new version firmware from the update image file by the controller, and copying the code segment of the new version firmware to a fourth block in the blocks. Then, copying the fourth block to replace the second block, and copying the fourth block to replace the first block.

BRIEF DESCRIPTION OF THE DRAWINGS

The present invention will become more readily apparent to those ordinarily skilled in the art after reviewing the following detailed description and accompanying drawings, in which:

FIG. 3C is a schematic diagram of the operation when step S130 is performed in the firmware updating method of FIG. 2;

FIG. 3D is a schematic diagram of the operation when step S140 is performed in the firmware updating method of FIG. 2;

DETAILED DESCRIPTION OF PREFERRED EMBODIMENTS

Figure 1:
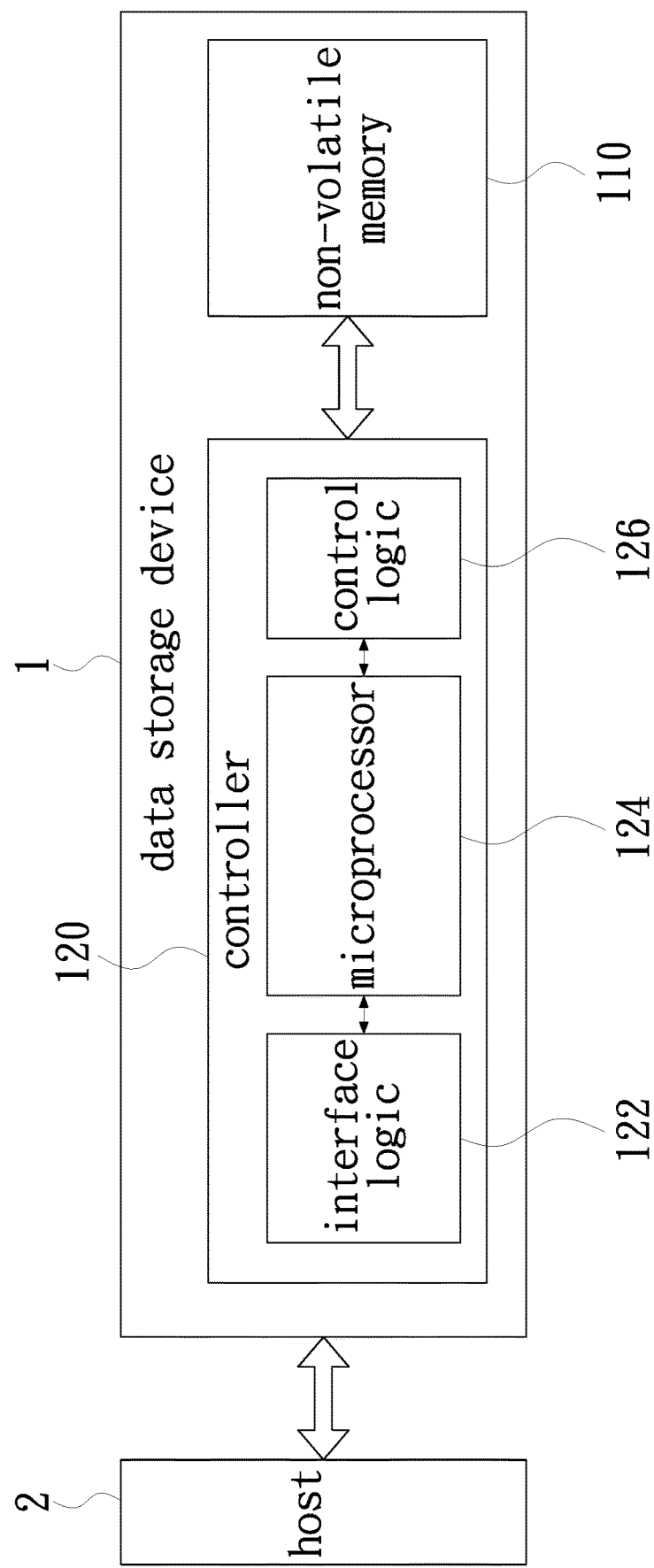
FIG. 1 is a functional block diagram of a data storage device according to an embodiment of the present invention.

Firstly, please refer to FIG. 1. FIG. 1 is a functional block diagram of a data storage device according to an embodiment of the present invention. The data storage device 1 comprises a non-volatile memory 110 and a controller 120. In this embodiment, the non-volatile memory 110 comprises a plurality of blocks (not shown), and the block is the smallest unit of data erasing, wherein the block can be divided into a spare block, an active block and a data block according to its function. The spare block is a block that can be selected and to which data can be written, the active block is a block that is selected and to which data is being written, and the data block is a block that has completed data writing and to which data is no longer written. It should be explained that the present invention does not limit the specific implementation manner of the blocks, and those ordinarily skilled in the art should be able to make related designs according to actual needs or applications. In addition, in this embodiment, the non-volatile memory 110 can be implemented, for example, by a flash memory, but the invention is not limited thereto.

In addition, the controller 120 is electrically coupled to the non-volatile memory 110 and used to control data access of the non-volatile memory 110. It should be understood that the data storage device 1 is usually used together with a host 2 for writing data to the non-volatile memory 110 or reading data from the non-volatile memory 110 according to a write/read command issued by the host 2. Therefore, in this embodiment, the controller 120 can be a memory controller, and comprises an interface logic 122, a microprocessor 124 and a control logic 126. The microprocessor 124 is electrically coupled to the interface logic 122 and the control logic 126, and it is used to receive the write/read command issued from the host 2 through the interface logic 122, and access the data in the non-volatile memory 110 through the control logic 126.

In this embodiment, the host 2 can be implemented, for example, by a computer, a mobile phone, a tablet, a camera, or any electronic device having an arithmetic function, but the present invention is not limited thereto. It should be understood that the host 2 downloads an update image file, such as a field firmware update (FFU) image file, required to update or upgrade the data storage device 1 via a network or other devices, and transmits the downloaded update image file to the data storage device 1 for updating or upgrading a firmware or parameters in the data storage device 1. However, since the operation principles of the data storage device 1 and the host 2 are well known to those having ordinary skill in the art, the details of the above-mentioned contents will not be further described herein.

Figure 2:
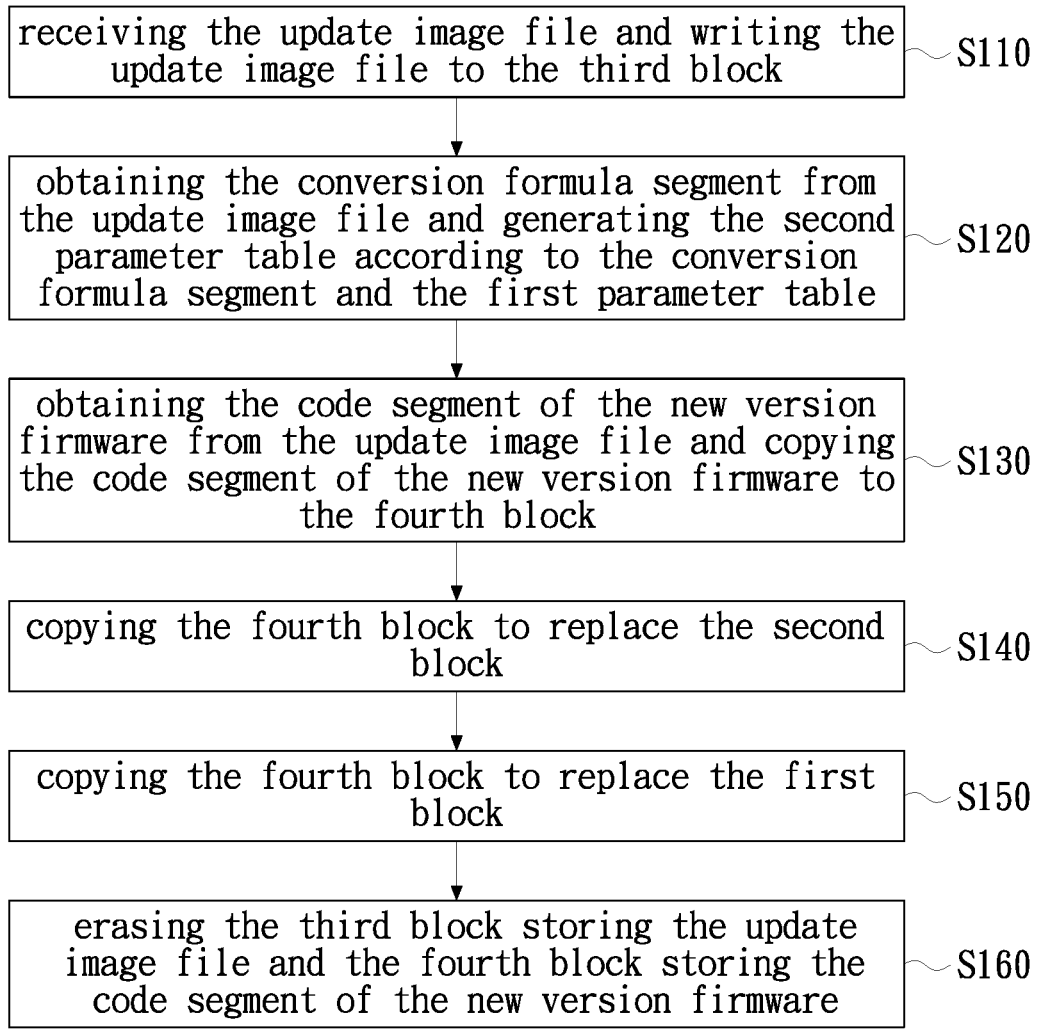
FIG. 2 is a flowchart of a firmware updating method according to an embodiment of the present invention.

Next, please refer to FIG. 2 and FIG. 3A to FIG. 3F together. FIG. 2 is a flowchart of a firmware updating method according to an embodiment of the present invention, and FIG. 3A to FIG. 3F are respectively schematic diagrams of the operation when each process step is performed in the firmware updating method of FIG. 2. It should be explained that the firmware updating method of FIG. 2 can be adapted to the data storage device 1 of FIG. 1, but the present invention does not limit the firmware updating method of FIG. 2 to be adapted only to the data storage device 1 of FIG. 1.

Figure 3A:
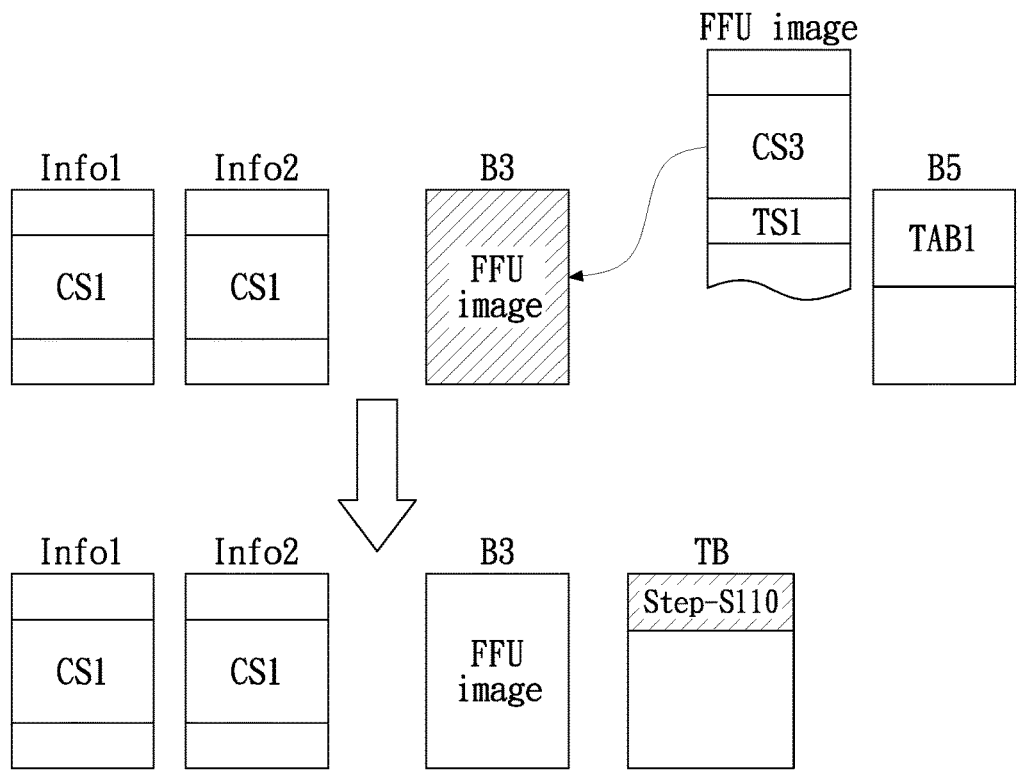
FIG. 3A is a schematic diagram of the operation when step S110 is performed in the firmware updating method of FIG. 2.

Firstly, as shown in FIG. 2 and FIG. 3A, in step S110, receiving the update image file, such as an FFU image file, required for updating the data storage device 1 by the controller 120, and writing the FFU image file to a third block B3 in the non-volatile memory 110. In this embodiment, the third block B3 is preferably a spare block, and the controller 120 preferably receives the FFU image file from the host 2, but the invention is not limited thereto. In addition, a first block Info1 of the blocks in the non-volatile memory 110 has stored a code segment of an old version firmware, that is, the code segment of the firmware currently being used, for example, a code segment CS1 of a first version firmware. And a second block Info2 in the blocks is a backup or duplication of the first block Info1, that is, both the first block Info1 and the second block Info2 store the code segment CS1 of the old version firmware. Therefore, when the first block Info1 is lost or cannot be accessed, the controller 120 can directly access the second block Info2. Of course, the controller 120 can also exchange the functions of the first block Info1 and the second block Info2. In summary, the present invention does not limit the specific implementation manner of the first block info 1 and the second block info 2, and those ordinarily skilled in the art should be able to make related designs according to actual needs or applications. It can be understood that the first block Info1, the second block Info2, and the third block B3 are preferably data-programmed in a SLC (Single Level Cell) mode respectively, for example, the controller 120 writes (programs) the FFU image file to the third block B3 in the SLC mode, but the present invention is not limited thereto. In addition, in this embodiment, the FFU image file can include a code segment of a new version firmware, such as a code segment CS3 of a third version firmware, and a conversion formula segment related to the code segment of the old version firmware, such as a conversion formula segment TS1 related to the code segment CS1 of the first version firmware. It should be noted that, in order to facilitate the following description, the firmware updating method of the present embodiment is described by first using an example in which the first version firmware is updated to the third version firmware, but it is not used to limit the present invention.

Figure 3B:
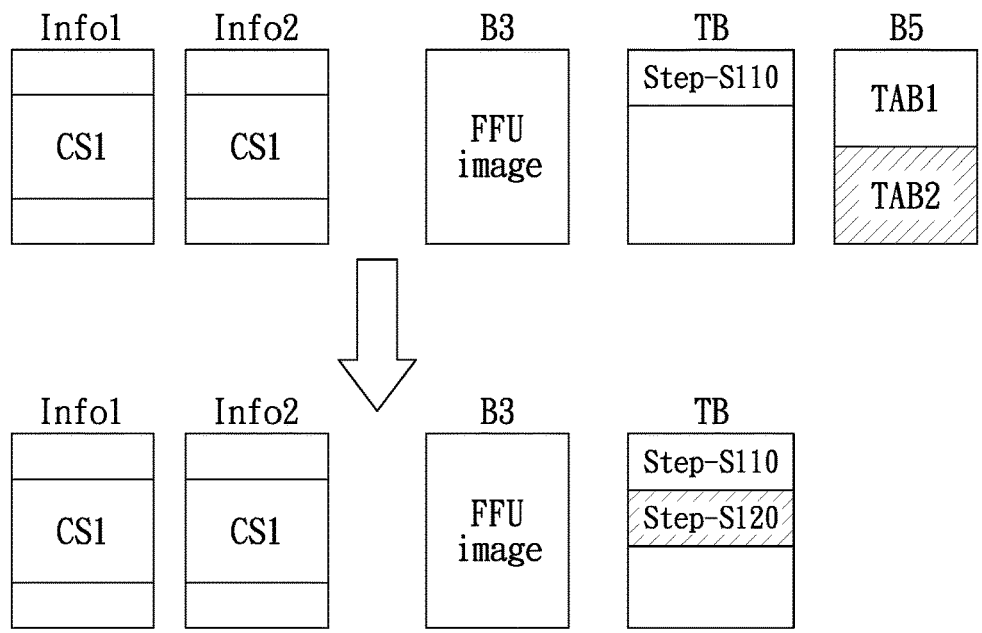
FIG. 3B is a schematic diagram of the operation when step S120 is performed in the firmware updating method of FIG. 2.

Secondly, as shown in FIG. 2 and FIG. 3B, in step S120, obtaining the conversion formula segment TS1 from the FFU image file by the controller 120, and generating a second parameter table TAB2 according to the conversion formula segment TS1 and a first parameter table TAB1, wherein the first parameter table TAB1 stores the parameters required for the operation of the code segment CS1 of the first version firmware, and the second parameter table TAB2 stores the parameters required for the operation of the code segment CS3 of the third version firmware. In this embodiment, the first parameter table TAB1 corresponding to the code segment CS1 of the first version firmware will be stored in a fifth block B5 in the non-volatile memory 110, and the controller 120 (the microprocessor 124 thereof) can convert the first parameter table TAB1 according to the conversion formula segment TS1 to generate the second parameter table TAB2. It can be understood that the controller 120 preferably stores the second parameter table TAB2 in the fifth block B5 also, thereby saving the use rate of the blocks, but the invention is not limited thereto. Of course, the controller 120 can also store the second parameter table TAB2 in another spare block, such as a sixth block B6 (not shown). In summary, the present invention does not limit the specific implementation manner of the fifth block B5 or the sixth block B6, and the above-mentioned fifth block B5 or sixth block B6 is also preferably data-programmed in the SLC mode.

Generally, when the data storage device 1 is in operation, the controller 120 loads the code segment CS1 of the first version firmware stored in the first block Info1 or the second block Info2, and cooperates with the first parameter table TAB1 to obtain the parameter address and parameter value required for operation in order to provide complete functionality. However, in the conventional firmware updating method, the controller 120 will directly replace the code segment CS1 of the first version firmware stored in the first block Info1 and the second block Info2 by using the code segment CS3 of the third version firmware in the FFU image file, and cooperate with the first parameter table TAB1 to obtain the parameter address and parameter value required for operation. Therefore, if the parameter value or parameter address required for the code segment CS3 of the third version firmware to read a newly added parameter Y has been changed, for example, the parameter address of a parameter X is changed from the original 0xA0 to 0xA1, and the parameter address of the newly added parameter Y is specified as 0xA0; or the parameter value has been changed, for example, the parameter value of the parameter X is changed from the original 0x00 to 0x01; the above change will cause the code segment CS3 of the third version firmware to fail to obtain the correct parameters by using the first parameter table TAB1, so that the updated or upgraded data storage device 1 cannot operate normally.

In order to solve the above problem, in the present invention, the conversion formula segment TS1 related to the code segment CS1 of the first version firmware is further configured in the FFU image file required for the update, and in step S120, after obtaining the conversion formula segment TS1 from the FFU image file, the controller 120 generates the second parameter table TAB2 according to the conversion formula segment TS1 and the first parameter table TAB1. It should be understood that the conversion formula segment TS1 of the present embodiment can be composed, for example, of a plurality of codes, and the operation mode of substituting the conversion formula segment TS1 by the controller 120 is the same as the operation mode of substituting the code segment CS1 of the first version firmware by the controller 120, thus the details of the above-mentioned contents will not be further described herein.

Similarly, if in a condition where the current firmware of the data storage device 1 is a second version of the firmware, it means that the first block Info1 and the second block Info2 are stored with a code segment CS2 of the second version firmware (not shown) rather than the code segment CS1 of the first version firmware. Therefore, in the present invention, the FFU image file required for updating is configured with a conversion formula segment TS2 (not shown) related to the code segment CS2 of the second version firmware in addition to the conversion formula segment TS1 related to the code segment CS1 of the first version firmware. Furthermore, in step S120 of the present embodiment, the controller 120 no longer generates the second parameter table TAB2 according to the conversion formula segment TS1, but generates the second parameter table TAB2 according to the conversion formula segment TS2. That is, the FFU image file of this embodiment can be adapted to the update of any old version firmware. Since the details are also the same as the aforementioned contents, they will not be further described herein.

In addition, once an interrupt event has occurred during the firmware updating process, such as a power outage, the prior art can only restart the firmware updating method all over again. Therefore, in order to improve the above-mentioned drawback, in this embodiment, the controller 120 preferably records a step tag or flag corresponding to one of the steps in a table block TB of the non-volatile memory 110. For example, after the execution of step S110 is complete, the controller 120 can record a first step tag corresponding to step S110 in the table block TB, as shown in FIG. 3A, and after the execution of step S120 is complete, the controller 120 can record a second step tag corresponding to step S120 in the table block TB, as shown in FIG. 3B. It can be understood that the above table block TB is also preferably another spare block, and it is preferable to be data programmed in the SLC mode, but the present invention is not limited thereto. Alternatively, in other embodiments, the step tag or flag can also be stored directly after the second parameter table TAB2 in the fifth block B5, thereby saving the use rate of the blocks. In summary, the present invention does not limit the specific implementation manner of the above table block TB, and those ordinarily skilled in the art should be able to make related designs according to actual needs or applications.

However, since the above-mentioned step tags are used to indicate the processed steps in the firmware updating method of FIG. 2, thus in this embodiment, the first step tag can be implemented, for example, by "step-S110", and the second step tag can be implemented, for example, by "step-S120", but the present invention does not limit the specific implementation manner of the first step tag and the second step tag, and those ordinarily skilled in the art should be able to make related designs according to actual needs or application. In addition, since each of the blocks in the non-volatile memory 110 can further include a plurality of pages, and the page is the smallest unit of data writing or reading; thus in other words, the first step tag "step-S110" and the second step tag "step-S120" are respectively written on a page of the table block TB, as shown in FIG. 3A and FIG. 3B, but the present invention is not limited thereto. With regard to the specific content of using each of the step tags in this embodiment for improving the drawback in the prior art of only able to restart the firmware updating method all over again after an interrupt event has occurred during the firmware updating process, it will be explained in detail hereinafter and thus will not be further described herein.

Next, as shown in FIG. 2 and FIG. 3C, in step S130, obtaining the code segment CS3 of the third version firmware from the FFU image file by the controller 120, and copying the code segment CS3 of the third version firmware to a fourth block B4 in the non-volatile memory 110. In this embodiment, the fourth block B4 is preferably another spare block, and the controller 120 preferably programs the code segment CS3 of the third version firmware to the fourth block B4 in the SLC mode, but the present invention is also not limited thereto. It can be understood that, in this embodiment, after the code segment CS3 of the third version firmware is copied to the fourth block B4, the controller 120 records a third step tag (for example, "step-S130") in the table block TB, as shown in FIG. 3C.

Figure 3E:
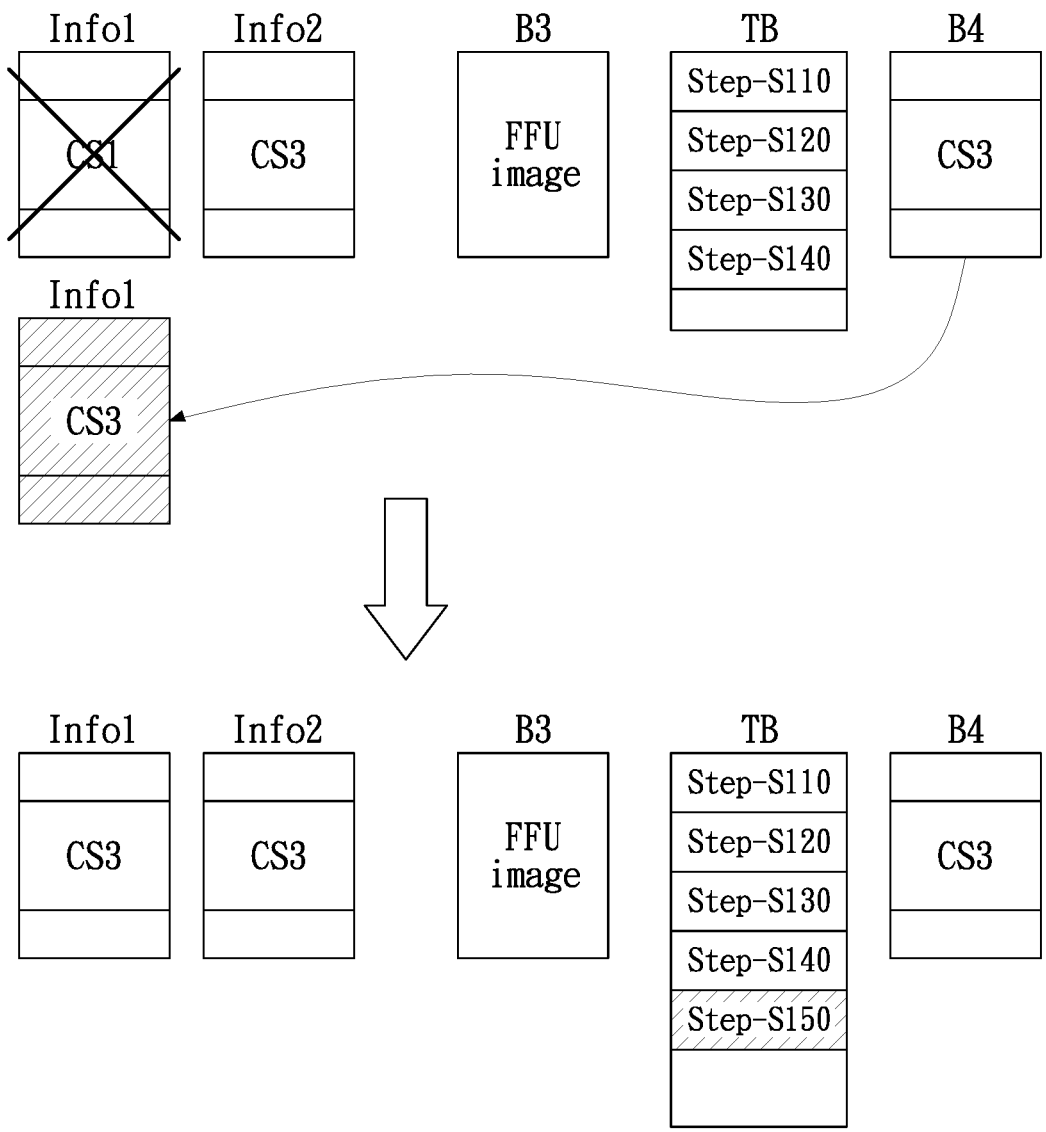
FIG. 3E is a schematic diagram of the operation when step S150 is performed in the firmware updating method of FIG. 2.

Then, as shown in FIGS. 2 and 3D, in step S140, copying the fourth block B4 to replace the second block Info2 by the controller 120. In this embodiment, the controller 120 preferably backs up the fourth block B4 to another spare block and replaces the second block Info2 with the backup block of the fourth block B4. It can be understood that when the second block Info2 storing the code segment CS1 of the first version firmware has been replaced by the backup block of the fourth block B4 storing the code segment CS3 of the third version firmware, the controller 120 preferably recovers the second block Info2 storing the code segment CS1 of the first version firmware into a spare block, that is, erases the second block Info2 storing the code segment CS1 of the first version firmware, as shown in FIG. 3D. Correspondingly, as shown in FIGS. 2 and 3E, in step S150, copying the fourth block B4 to replace the first block Info1 by the controller 120. It can also be understood that the controller 120 preferably backs up the fourth block B4 to another spare block and replaces the first block Info1 with the backup block of the fourth block B4, and when the first block Info1 storing the code segment CS1 of the first version firmware has been replaced by the backup block of the fourth block B4 storing the code segment CS3 of the third version firmware, the controller 120 preferably recovers the first block Info1 storing the code segment CS1 of the first version firmware into a spare block, that is, erases the first block Info1 storing the code segment CS1 of the first version firmware, as shown in FIG. 3E.

Therefore, after step S140 and step S150, both the first block Info1 and the second block Info2 in the data storage device 1 of the present embodiment storing the code segment CS1 of the first version firmware have been replaced by the backup blocks of the fourth block B4 storing the code segment CS3 of the third version firmware, that is, the backup blocks of the fourth block B4 storing the code segment CS3 of the third firmware are used as the new first block Info1 and the new second block Info2. It is worth mentioning that the sequence of step S140 and step S150 in FIG. 2 is only for exemplification, and is not intended to limit the present invention. In other embodiments, the data storage device 1 can also reverse the sequence of step S140 and step S150, which does not affect the implementation of the present invention. Similarly, in this embodiment, after copying the fourth block B4 to replace the second block Info2, recording a fourth step tag (for example, "step-S140") in the table block TB by the controller 120, as shown in FIG. 3D, and after copying the fourth block B4 to replace the first block Info1, recording a fifth step tag (for example, "step-S150") in the table block TB by the controller 120, as shown in FIG. 3E. It should be explained that, in other embodiments, in step S150, it can also be changed to: replacing the first block Info1 with the fourth block B4 directly.

Figure 3F:
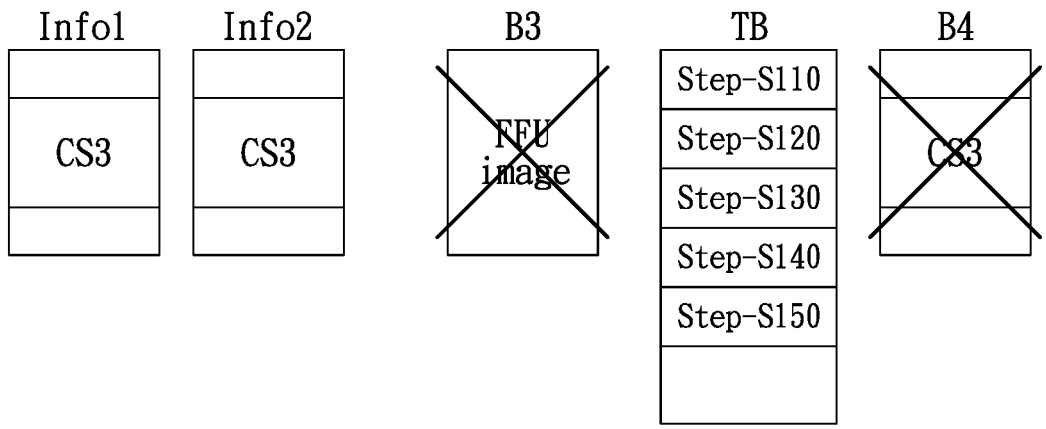
FIG. 3F is a schematic diagram of the operation when step S160 is performed in the firmware updating method of FIG. 2.
Figure 3F:
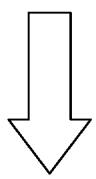
Figure 3F:
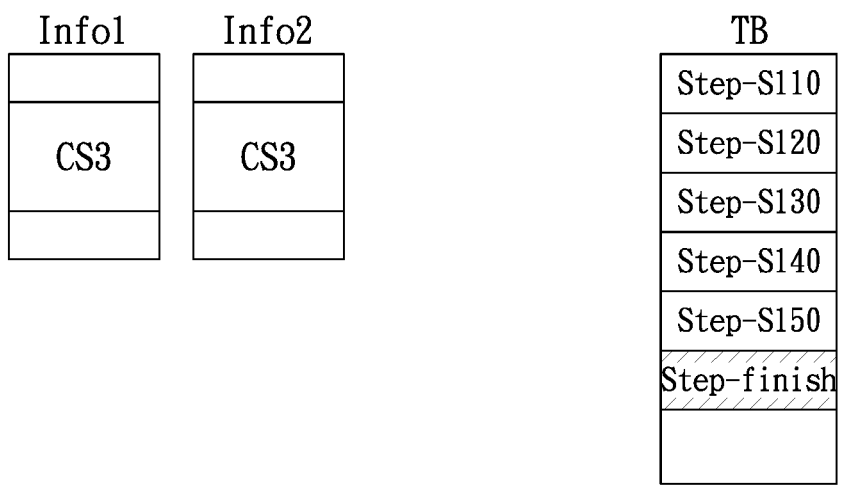

Finally, as shown in FIG. 2 and FIG. 3F, in step S160, recovering the third block B3 storing the FFU image file and the fourth block B4 storing the code segment CS3 of the third version firmware into spare blocks by the controller 120, that is, erasing the third block B3 storing the FFU image file and the fourth block B4 storing the code segment CS3 of the third version firmware, thereby reducing excessive waste of the spare blocks, and increasing the usable rate of the overall blocks. It can be understood that, in this embodiment, after the third block B3 and the fourth block B4 have been recovered into the spare blocks, the controller 120 records a sixth step tag (for example, "step-finish") in the table block TB, as shown in FIG. 3F, and after the execution of the firmware updating method of the present invention is complete, the controller 120 preferably starts a reset process, thereby implementing the completion of updating the firmware of the data storage device 1. Since the operation principles of completing the firmware update of the data storage device 1 through resetting by the controller 120 are well known to those having ordinary skill in the art, the details of the above-mentioned contents will not be further described herein.

Apparently, compared to the prior art, when the updated or upgraded data storage device 1 operates, the controller 120 loads the code segment CS3 of the third version firmware (new version firmware) stored in the first block Info1 or the second block Info2, and executes the function of the third version firmware in conjunction with the second parameter table TAB2 instead. Therefore, even if in a condition where there is a newly added or changed parameter between the code segment CS1 of the first version firmware and the code segment CS3 of the third version firmware, the updated or upgraded data storage device 1 can still operate normally.

On the other hand, the same as described in the foregoing, each of the step tags is used in this embodiment for improving the drawback in the prior art of only able to restart the firmware updating method all over again after an interrupt event has occurred during the firmware updating process. For example, during the firmware updating process, that is, when an interrupt event occurs in the firmware updating method of FIG. 2, the controller 120 checks whether the first to sixth step tags are recorded in the table block TB. If only the first to fifth step tags are recorded in the table block TB, it means that the firmware updating method of FIG. 2 has completed step S110 to step S150 before the interruption event occurs, but step S160 has not been completed yet. Therefore, after the interruption event ends, the controller 120 re-executes step S160 according to the above-mentioned checking result to continue the execution of the firmware updating method of the present invention. Similarly, if only the first to fourth step tags are recorded in the table block TB, it means that the firmware updating method of FIG. 2 has completed step S110 to step S140 before the interruption event occurs, but step S150 to step S160 have not been completed yet. Therefore, after the interruption event ends, the controller 120 re-executes step S150 to step S160 according to the above-mentioned checking result to complete the firmware updating method of the present invention. By analogy, if the first to sixth step tags are not recorded in the table block TB, it means that the firmware updating method of FIG. 2 has not completed any step before the interruption event occurs, and therefore, after the interruption event ends, the controller 120 in this embodiment re-executes the firmware updating method of the present invention according to the above checking result. It should be understood that, after the current new version firmware has been updated successfully, the present embodiment preferably erases the current table block TB to avoid repeatedly executing the firmware updating method of the present invention. In summary, the above-mentioned specific implementation manner of re-executing the firmware updating method directly from the step that has never been processed according to the checking result is merely an example herein, which is not intended to limit the present invention, and those ordinarily skilled in the art should be able to make related designs according to actual needs or applications.

In summary, the firmware updating method provided by the embodiments of the present invention is adapted to a data storage device, and it can generate a new parameter table according to a conversion formula segment in an update image file required for updating the data storage device. Therefore, even if in a condition where there is a parameter change between a code segment of an old version firmware and a code segment of a new version firmware, the updated or upgraded data storage device can still operate normally. In addition, since the firmware updating method can also mark the processed steps by using the step tags, the present invention can also improve the drawback in the prior art of only able to restart the firmware updating method all over again after an interrupt event has occurred during the firmware updating process.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A firmware updating method, adapted to a data storage device, the data storage device comprising a non-volatile memory and a controller, the non-volatile memory comprising a plurality of blocks, and both a first block and a second block in the blocks storing a code segment of an old version firmware, the firmware updating method comprising following steps of:

receiving an update image file required for updating the data storage device by the controller, and writing the update image file to a third block in the blocks, wherein the update image file comprises the code segment of a new version firmware and a conversion formula segment related to the code segment of the old version firmware;

obtaining the conversion formula segment from the update image file by the controller, and generating a second parameter table according to the conversion formula segment and a first parameter table, wherein the first parameter table stores the parameters required for the operation of the code segment of the old version firmware, and the second parameter table stores the parameters required for the operation of the code segment of the new version firmware;

obtaining the code segment of the new version firmware from the update image file by the controller, and copying the code segment of the new version firmware to a fourth block in the blocks; and copying the fourth block to a first spare block to replace the second block by the controller, copying the fourth block to a second spare block to replace the first block by the controller, and erasing the first block and the second block by the controller.

2. The firmware updating method according to claim 1, further comprising:

after copying the fourth block to the second spare block to replace the first block, erasing the third block storing the update image file and the fourth block storing the code segment of the new version firmware by the controller.

3. The firmware updating method according to claim 2, further comprising:
   after writing the update image file to the third block, recording a first step tag in a table block by the controller, wherein the table block is one of the blocks; and
   after generating the second parameter table, recording a second step tag in the table block by the controller.

4. The firmware updating method according to claim 3, further comprising:
   after copying the code segment of the new version firmware to the fourth block, recording a third step tag in the table block by the controller.

5. The firmware updating method according to claim 4, further comprising:
   after copying the fourth block to the first spare block to replace the second block, recording a fourth step tag in the table block by the controller; and
   after copying the fourth block to the second spare block to replace the first block, recording a fifth step tag in the table block by the controller.

6. The firmware updating method according to claim 5, further comprising:
   after erasing the third block storing the update image file and the fourth block storing the code segment of the new version firmware, recording a sixth step tag in the table block by the controller.

7. The firmware updating method according to claim 6, wherein the first to the sixth step tags are respectively used to indicate one of the processed steps in the firmware updating method.

8. The firmware updating method according to claim 7, wherein when an interrupt event occurs in the firmware updating method, the controller checks whether the first to sixth step tags are recorded in the table block, and after the interruption event ends, the controller re-executes the firmware updating method directly from the step that has never been processed according to a checking result.

9. The firmware updating method according to claim 1, wherein the first parameter table is stored in a fifth block in the blocks, and the second parameter table is also stored in the fifth block, or is stored in a sixth block in the blocks.

* * * * *